(12) United States Patent
Ulmer et al.

(10) Patent No.: US 10,456,876 B2
(45) Date of Patent: Oct. 29, 2019

(54) MOBILE PIPE CUTTING STATION

(71) Applicants: Erik Haakon Ulmer, Surrey (CA); Donald Martin Ulmer, White Rock (CA)

(72) Inventors: Erik Haakon Ulmer, Surrey (CA); Donald Martin Ulmer, White Rock (CA)

( * ) Notice: Subject to any disclaimer, the term of this patent is extended or adjusted under 35 U.S.C. 154(b) by 405 days.

(21) Appl. No.: 15/348,096

(22) Filed: Nov. 10, 2016

(65) Prior Publication Data

US 2017/0129059 A1    May 11, 2017

Related U.S. Application Data

(60) Provisional application No. 62/253,182, filed on Nov. 10, 2015.

(51) Int. Cl.
| | |
|---|---|
| *B23K 10/00* | (2006.01) |
| *B23K 37/02* | (2006.01) |
| *B23K 37/00* | (2006.01) |
| *G05B 19/402* | (2006.01) |

(52) U.S. Cl.
CPC .......... *B23K 37/0276* (2013.01); *B23K 10/00* (2013.01); *B23K 37/006* (2013.01); *G05B 19/402* (2013.01); *G05B 2219/36283* (2013.01)

(58) Field of Classification Search
CPC .. B23K 10/00; B23K 10/006; B23K 37/0276; B23K 37/006; B23K 37/0288; B23K 2201/06; B23K 2201/10; H05H 1/36; H05H 1/26; G05B 19/402; G05B 2219/36283

USPC ............. 219/121.44, 121.48, 121.39, 121.54
See application file for complete search history.

(56) References Cited

U.S. PATENT DOCUMENTS

| | | | |
|---|---|---|---|
| 6,386,797 B1* | 5/2002 | Gearhart | ............... F16L 55/265 |
| | | | 166/55.7 |
| 7,140,409 B2 | 11/2006 | Leberfinger et al. | |
| 2010/0166513 A1 | 7/2010 | Karow | |

(Continued)

*Primary Examiner* — Mark H Paschall
(74) *Attorney, Agent, or Firm* — Baumgartner Patent Law; Marc Baumgartner

(57) ABSTRACT

A mobile-unit station dedicated to pipe cutting is provided. The station comprises an intermodal container including: a pipe cutting room comprising a first exterior door for egress to an ambient environment at a first end and an interior door at a second end, respectively, of the pipe cutting room and an at least one portal door for egress to the ambient environment on the first end; a temperature controlled clean room separated from the pipe cutting room with a fireproof wall with the interior door therethrough, the pipe cutting room housing a plurality of components therein including: a monorail extending substantially a length of the pipe cutting room, a powered hoist and a powered trolley moveably mounted on the monorail, a pipe conveyor mounted on a floor and aligned with the monorail to provide a hallway between the first door and the second door, a Computer Numerical Control (CNC) pipe cutter and an at least one dust extraction duct of a dust extraction system proximate the pipe supports, the clean room housing a plurality of components therein including: a CNC pipe cutter control box, a computer for the CNC pipe cutter, a heating and air conditioning unit, and a data management system.

19 Claims, 11 Drawing Sheets

(56) References Cited

U.S. PATENT DOCUMENTS

2012/0151978 A1\* 6/2012 Zepp ..................... B21C 37/12
                                                    72/6.1
2012/0215348 A1\* 8/2012 Skrinde ................. B08B 9/049
                                                    700/245

\* cited by examiner

MOBILE PIPE CUTTING STATION

CROSS REFERENCE TO RELATED APPLICATIONS

This application is related to, and claims the benefit of, U.S. Provisional Patent Application No. 62/253,182, filed Nov. 10, 2015. The above-identified priority patent application is incorporated herein by reference in its entirety.

FIELD OF THE INVENTION

The present technology is a self contained mobile pipe cutting station for use in the field and remote locations. More specifically, it is a pipe cutting system housed in an intermodal container.

BACKGROUND

As more and more oil and gas, power generation, and mining industry projects surface to meet globular demands of an ever-expanding population, more piping systems must be planned, permitted and constructed to convey material. The methods of cutting metal pipes on construction sites (onsite) are lengthy, costly, and sometimes challenging in terms of meeting codes and standards in terms of quality and safety. The more productive and modern methods of cutting metal pipe are confined to local fabrication shops due to their physical size and immobility and are not used onsite.

The cuts that are performed onsite are done using conventional oxy-fuel or plasma cutting by hand, oxy fuel, plasma on a cumbersome carriage mounted on the pipe, and other mechanical methods such as grinding discs, toothed saws, and routers. These cuts require one or more skilled tradesmen, usually pipefitters and pipe welders, to understand piping systems, compute and calculate the cut profile, as well as measure and mark the cut. Performing the cut itself requires good operator skill and predetermined engineering quality standards need to be met. The degree of difficulty in performing the cut depends on the complexity of the joint and can range from a straight cut to a mitered and coped cut with weld preparation bevel. Some cuts are extremely challenging for a tradesman to compute and mark due to their eccentricity and complexity and are performed by trial and error by repeated test fitting. Further, a single pipe can have multiple cuts and holes further increasing the risk for incorrect cuts requiring repair and rework. Larger and longer pipes are very heavy and difficult to cut and the safety hazard is increased when handling. Further to all the above, cutting a single joint onsite using conventional methods can take 10 minutes up to 8 hours or more and will usually require more than one tradesman to perform cuts.

As will be readily appreciated, there is a need for improved efficiency, reduced cost, better quality, and safer methods for cutting pipe onsite. Despite this, there have been few attempts to improve pipe cutting onsite. One approach is disclosed in U.S. Patent Application 20100166513, which is directed to a mobile device for simultaneously cutting and chamfering a pipe, having a frame, at least one pipe collet-clamp attached to the frame and defining a principal axis, a split carriage rotatably mounted with respect to the frame about the axis and adjacent to the clamp(s), a router affixed to the split carriage and having a cutting-chamfering bit, and a drive motor for rotating the carriage. The router orbits around the pipe and simultaneously cuts it into two chamfered pipes. A method is also provided for cutting through a pipe and chamfering the cut ends thereof. This offers an improvement in safety and accuracy, however, much more can be done to provide a safe working environment, reduce man hours for tasks, improve efficiency, decrease human error, improve cut quality and increase safety. This method of cutting is slow with a router bit. Further it requires the tedious task of set up and removal for each and every cut.

U.S. Pat. No. 7,140,409 discloses a complete and portable tool for retaining round, square or other non-flat stock, especially pipes, in a secure fashion while cutting and related operations are performed thereon. The portable pipe cutting tool includes an adjustable work support, V-shaped trough, chain and tightening device, catch tray, left and right support arm bracket, mounting stand, and power tool having a base portion that, as a unit, secure the pipe in place while being cut, grooved or otherwise worked on, by an operator. The portable pipe cutting tool prevents sideways, upward, rotational or other movement of the pipe during such operations. Again, this offers an improvement in safety and accuracy, however, it much more can be done to provide a safe working environment, reduce man hours for tasks, improve efficiency, decrease human error, improve cut quality and increase safety. This tool does not allow for eccentric cuts, bevelling, coping or holes. Further, it requires the tedious task of set up and removal for each and every cut.

What is needed is a modular mobile Computer Numerical Control (CNC) pipe cutting station that is easy to transport on and off the site. The station would preferably be housed in an intermodal unit, allowing for transport by conventional means. It would preferably require little in the way of set-up and assembly on site. The intermodal unit would preferably include all safety equipment generally used in a machine shop and on industrial construction sites. It would also preferably include a power pipe conveying system that would transport the pipe into and out of the intermodular container without requiring human interaction until it is clamped by the CNC machine. It would also preferably include a rail system employing an power trolley and power hoist for lifting and transporting pipe into and out of the intermodular container. The station would preferably include computer hardware and software for the purpose of computer aided manufacturing to compute all the cuts needed for the CNC machine, as well as interface with warehousing software for stock control, scheduling and other significant warehousing controls and to locate and track pipe. The station would preferably employ fire protection, heating and ventilation systems, lighting, fume extraction, and dust collection systems, an eye wash station, a first aid kit, that meet codes, standards and best industry practices to allow workers and technicians to safely work inside the intermodular container. The station would preferably allow for physically marking and thus identifying the pipe that has been cut. This would greatly improve pipe tracking. Further, it would allow for identification of the individual who installs or stores the pipe.

SUMMARY

The present technology is a modular mobile Computer Numerical Control (CNC) pipe cutting station that is easy to transport on and off the site. The station is housed in an intermodal unit, allowing for transport by conventional means. It requires little in the way of set-up and assembly on site. The intermodal unit includes all safety equipment generally used in a machine shop and on industrial construction sites. It also includes a power pipe conveying system that transports the pipe into and out of the intermodular container without requiring human interaction until it is clamped by the CNC machine. It also includes a dust collecting system and exterior infeed conveyor that are shipped with the conveyor and placed outside upon arrival onsite. It also includes a rail system employing a power trolley and power hoist for lifting and transporting pipe into and out of the intermodular container. The station includes computer hardware and software for the purpose of computer aided manufacturing to compute all the cuts needed for the CNC machine, as well as interface with warehousing software for stock control, scheduling and other significant warehousing controls and to locate and track pipe. The station employs fire protection, heating and ventilation systems, lighting, an eye wash station, a first aid kit, fume extraction, and dust collection systems that meet codes, standards and best industry practices to allow workers and technicians to safely work inside the intermodular container. The station allows for physically marking and thus identifying the pipe that has been cut. This greatly improves pipe tracking. Further, it allows for identification of the individual who installs or stores the pipe.

In one embodiment, a self-contained mobile pipe-cutting station is provided, the station comprising an International Organization for Standardization (ISO) container including: a pipe cutting room comprising a first exterior door for egress to an ambient environment at a first end and an interior door at a second end, respectively, of the pipe cutting room and an at least one ISO portal door for egress to the ambient environment on the first end; a temperature controlled clean room separated from the pipe cutting room with a fireproof wall with the interior door therethrough, the pipe cutting room housing a plurality of components therein including: a rail system extending substantially a length of the pipe cutting room and moveably mounted on a ceiling of the pipe cutting room, a powered hoist and a powered trolley moveably mounted on the rail system, a pipe conveyor mounted on a floor and aligned with the rail system to provide a hallway between the first exterior door and the interior door, a Computer Numerical Control (CNC) pipe cutter and a powered exterior conveyor, the powered exterior conveyor removably housed in the hallway and for locating outside the ISO container, the clean room housing a plurality of components therein including: a CNC pipe cutter electrical control box, a computer for the CNC pipe cutter, a heating and air conditioning unit, a data management system, a dust extraction duct in fluid communication with the pipe cutting room, and a dust and fume collector removably housed in the clean room for locating outside the ISO container and in fluid communication with the dust extraction duct.

In the station, the pipe cutting room may further comprise an operable wall extending between the first exterior door and the interior door and located between the hallway and the CNC pipe cutter.

In the station, the rail system may be a monorail, the monorail slidably retained by an at least one monorail slider mounted on the ceiling of the pipe cutting room.

The station may further comprise an opening between the pipe cutting room and the clean room for the monorail to extend into the clean room during storage and transport.

The station may further comprise a mechanical device mounted in the clean room, in mechanical communication with the monorail and in electrical communication with a motor for urging the monorail into and out of the clean room.

In the station, the mechanical device may be a leadscrew.

In the station, the mechanical device may be a double drum winch.

The station may further comprise a power system for electrical communication with any one of a battery, a power grid or a generator.

The station may further comprise a second exterior door for egress to the ambient environment from the clean room and an at least one exterior ISO portal door at a second end of the container.

In another embodiment, a method of cutting a pipe with a computer numerical control (CNC) pipe cutter is provided, the method comprising: loading the pipe to be cut into the self-contained mobile pipe-cutting station of claim 3; positioning a floating chuck of the CNC pipe cutter on the pipe; and cutting the pipe under control of the CNC pipe cutter to provide an at least one pipe section.

The method may further comprise removing the at least one pipe section from the pipe conveyor with the powered hoist loaded with the pipe section.

The method may further comprise urging the monorail from the clean room, so as to extend a length of the monorail from the self-contained mobile pipe-cutting station into the ambient.

The method may further comprise removing the pipe section from the self-contained mobile pipe-cutting station to the ambient with the powered trolley on the so extended monorail.

In another embodiment, a processor driven method of producing pipe sections in an on-site, mobile, self contained pipe cutter station is provided, the station comprising an ISO container, a CNC pipe cutter, a computer in electronic communication with the CNC pipe cutter, and a data management system, the method comprising designing an at least one pipe section to provide a plan, importing the plan into the computer for the CNC pipe cutter; and cutting an at least one cut in at least one pipe according to the plan; wherein all steps are conducted within the on-site, mobile, self contained station.

The method may further comprise managing a pipe inventory.

The method may further comprise estimating a total amount of pipe for a job.

The method may further comprise identifying the at least one pipe section.

The method may further comprise displaying a three-dimensional graphical representation of the at least one cut in the at least one pipe.

In the method, the plan may provide for multiple cuts in the at least one pipe.

In the method, the plan may provide for nesting pipe sections in the at least one pipe.

In another embodiment, a self contained mobile-unit station dedicated to pipe cutting is provided. The station comprises an intermodal container including: a pipe cutting room comprising a first exterior door for egress to an ambient environment at a first end and an interior door at a second end, respectively, of the pipe cutting room and an at least one International Organization for Standardization (ISO) portal door for egress to the ambient environment on the first end; a temperature controlled clean room separated from the pipe cutting room with a fireproof wall with the steel man door therethrough, the pipe cutting room housing a plurality of components therein including: a rail system extending substantially a length of the pipe cutting room, a powered hoist and a powered trolley moveably mounted on the rail system, a pipe conveyor mounted on a floor and aligned with the rail system to provide a hallway between the first door and the second door, a Computer Numerical Control (CNC) pipe cutter a powered exterior conveyor for locating outside the intermodal container, the clean room housing a plurality of components therein including: a CNC pipe cutter electrical control box, a computer for the CNC pipe cutter, a heating and air conditioning unit, a dust extraction duct and a data management system.

In the station, the pipe cutting room may further comprise a walkway between the first exterior door and the interior door. An operable wall divides the walkway from the pipe cutting room as a safety barrier to contain dust and fumes which are extracted through the dust extraction duct and contained inside the dust collector.

In the station, the plurality of components in the intermodal container may be affixed to the container.

The station may further comprise a power system configured for electrical communication with a battery, a power grid or a generator.

In the station, the rail system may be a monorail.

The station may further comprise a second exterior door for egress to the ambient environment from the clean room and an at least one exterior ISO portal door at a second end of the container In the station, the CNC cutter may include a floating chuck.

In another embodiment, a method of cutting a pipe with a computer numerical control (CNC) pipe cutter is provided, the method comprising: loading the pipe to be cut into an intermobile pipe rig, the intermobile pipe rig including an intermodal container housing a pipe conveyor and the CNC pipe cutter; positioning a floating chuck of the CNC pipe cutter on the pipe; and cutting the pipe under control of the CNC pipe cutter to provide an at least one pipe section.

The method may further comprise removing the at least one pipe section from the pipe conveyor with a powered hoist loaded with a pipe section.

The method may further comprise moving the pipe section to an exit with a powered trolley on an aerial rail which when arrival onsite slides out of the intermodal container in a cantilevered configuration to move pipe in and out of the intermodal container.

The method may compromise moving at least 1 pipe section from the intermodal container onto the exterior powered infeed conveyor which is located outside of the intermodal container. The exterior powered infeed conveyor is shipped inside the intermodal container by rolling it in on caster wheels into the hallway and securely strapped down for shipping.

In the method, wherein the aerial rail may be a monorail running substantially the length of the pipe conveyor. The aerial rail also extents and cantilevers outside the intermodal container a reasonable distance to allow pipe to safely be handled by forklift without interference with the intermodal container.

The method may further comprise designing the at least one pipe section to provide a plan and importing the plan into the CNC pipe cutter.

The method may further comprise identifying the pipe section.

The method may further comprise managing pipe inventory.

In yet another embodiment, a processor driven method of producing pipe sections in an on-site mobile-self contained station comprising an ISO container is provided, the method comprising designing an at least one pipe section to provide a plan, importing the plan into a CNC pipe cutter; and cutting an at least one cut in at least one pipe according to the plan; wherein all steps are conducted within the on-site mobile-self contained station.

The method may further comprise managing a pipe inventory.

The method may further comprise estimating a total amount of pipe for a job.

The method may further comprise identifying the at least one pipe section.

The method may further comprise displaying a three dimensional graphical representation of the at least one cut in the at least one pipe.

In the method, the plan may provide for multiple cuts in the at least one pipe.

In the method, the plan may provide for nesting pipe sections in the at least one pipe.

FIGURES

DETAILED DESCRIPTION

Figure 1A:
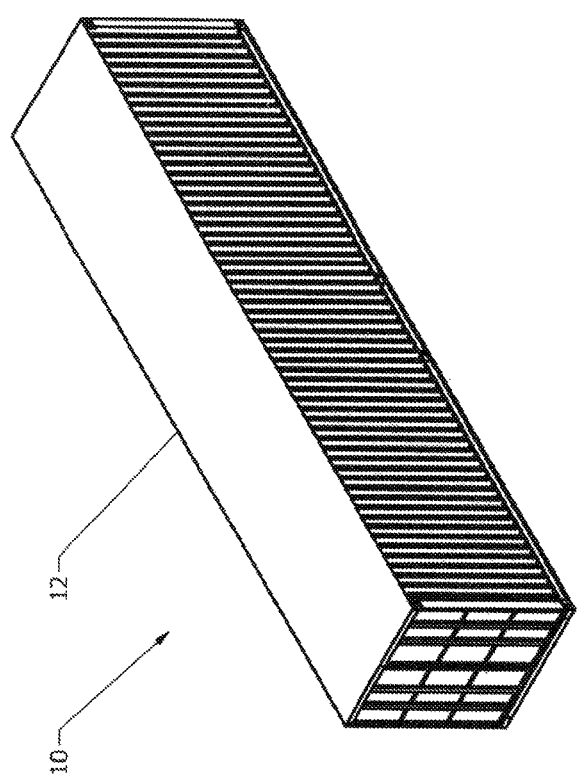
FIG. 1A is a perspective drawing showing a mobile CNC pipe cutting station in the storage and transport mode.
Figure 1B:
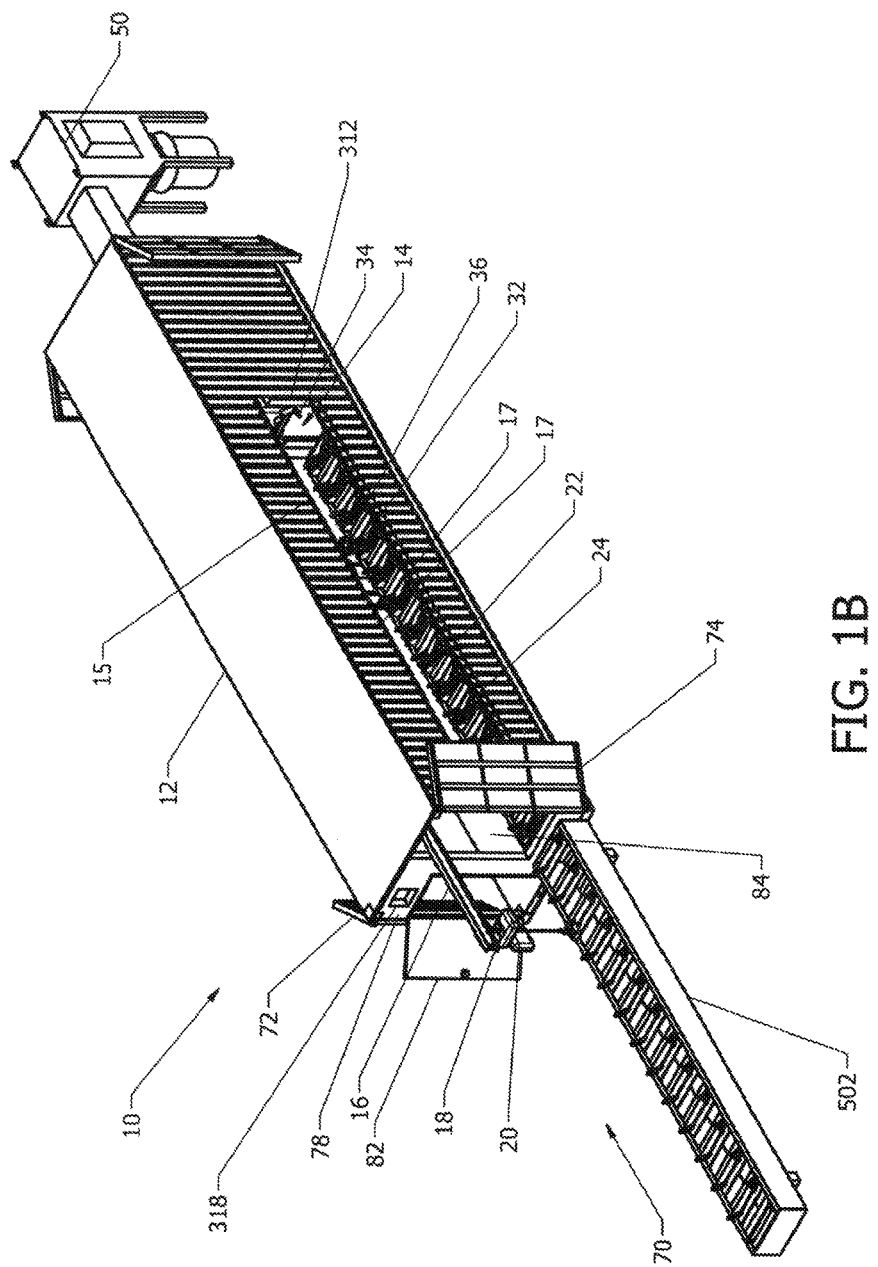
FIG. 1B is a perspective drawing showing the mobile CNC pipe cutting station in the operational mode in accordance with one embodiment of the present technology.

A mobile CNC pipe cutting station in the storage and transport mode, generally referred to as 10 is shown in FIG. 1A. All the components are contained within an intermodal container 12. The operational mode is shown in FIG. 1B. The intermodal container 12 houses a CNC machine 14. An opening 15 extends substantially the length of the CNC machine 14 to allow pipe to be loaded onto the CNC machine 14. Sliding doors 17 open and close to cover and expose the opening 15. These sliding doors are reinforced and configured to ensure that the container meets the International Organization for Standardization (ISO) standards for freight containers. An exterior infeed conveyor 502 is moved from the pipe cutting room 38 (FIG. 3) and is aligned with the CNC machine at the opening 84 for feeding pipe through the opening 84 and onto the CNC machine. A monorail 16, with a powered trolley 18 and a powered hoist 20 slidably mounted on the monorail, extends out from the pipe cutting room 38 overtop the exterior infeed conveyor 502. A dust and fume collector 50 is moved from the clean room 40 (FIG. 3) to the outside. The station 10 is then ready for use.

Figure 2:
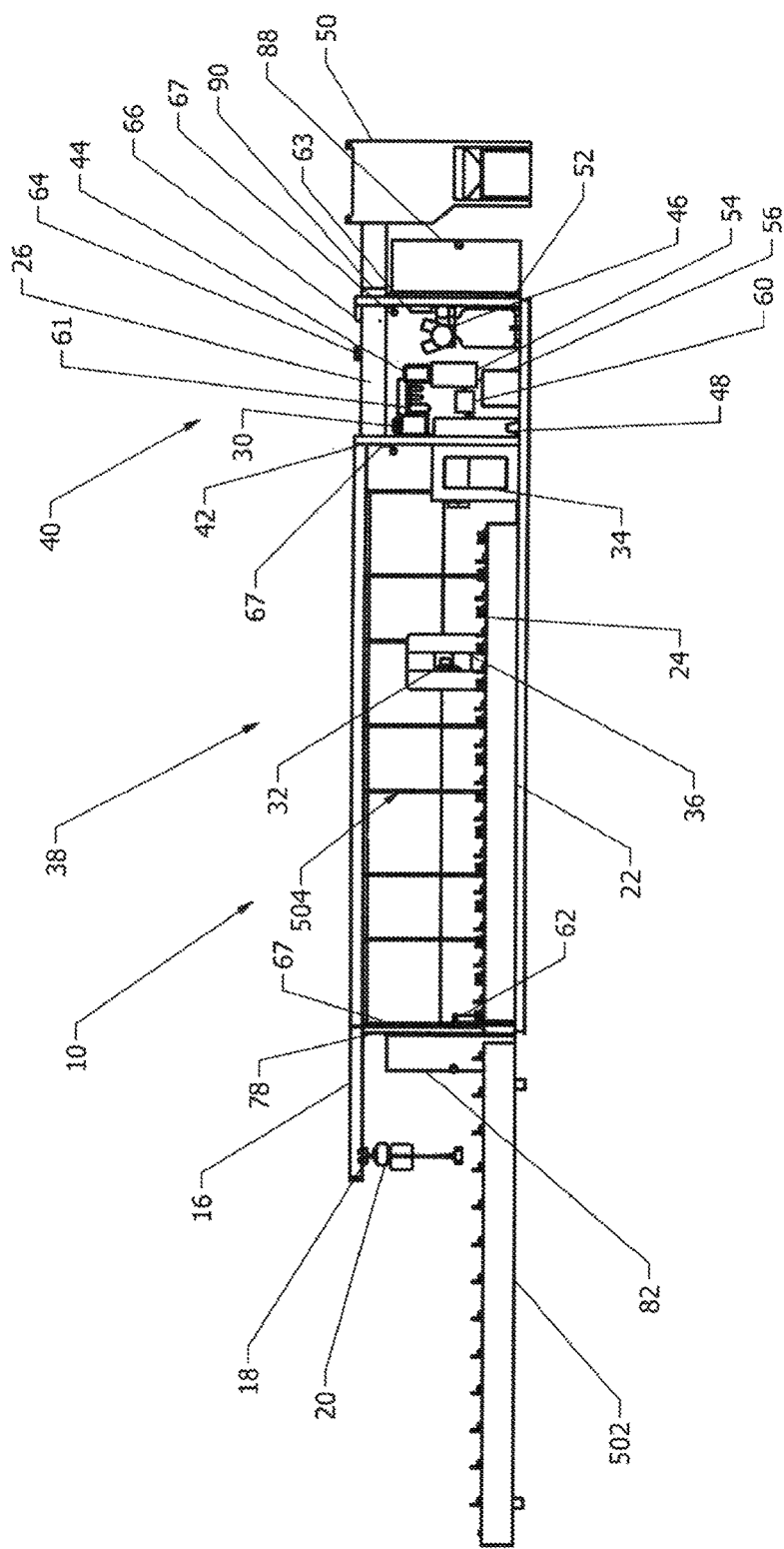
FIG. 2 is a front view of the mobile CNC pipe cutting station of FIG. 1 with the front exterior wall and roof not shown.

As shown in FIG. 2, the station 10 includes a monorail 16, a powered trolley 18 and a powered hoist 20, an infeed power roller pipe conveyor 22 extending longitudinally, each with at least two rollers 24, a power source 30, a plasma cutter torch 32, the CNC controlled moving cutting apparatus 36 and a floating chuck 34 of the CNC machine 14 in the pipe cutting room, generally referred to as 38. The monorail 16 is aligned with the conveyor 22 along the length of the pipe cutting room 38. The powered trolley 18 and powered hoist 20 travel along the monorail 16, which protrudes in a cantilevered configuration out of the intermodal container 12 to move cut sections of pipe vertically and horizontally. All pipe sections over 50 pounds are lifted with the powered trolley and powered hoist to when used in Canada, in order to comply with safety regulations.

In an alternative embodiment, the monorail can be any rail system, such as two adjacent rails.

Figure 3:
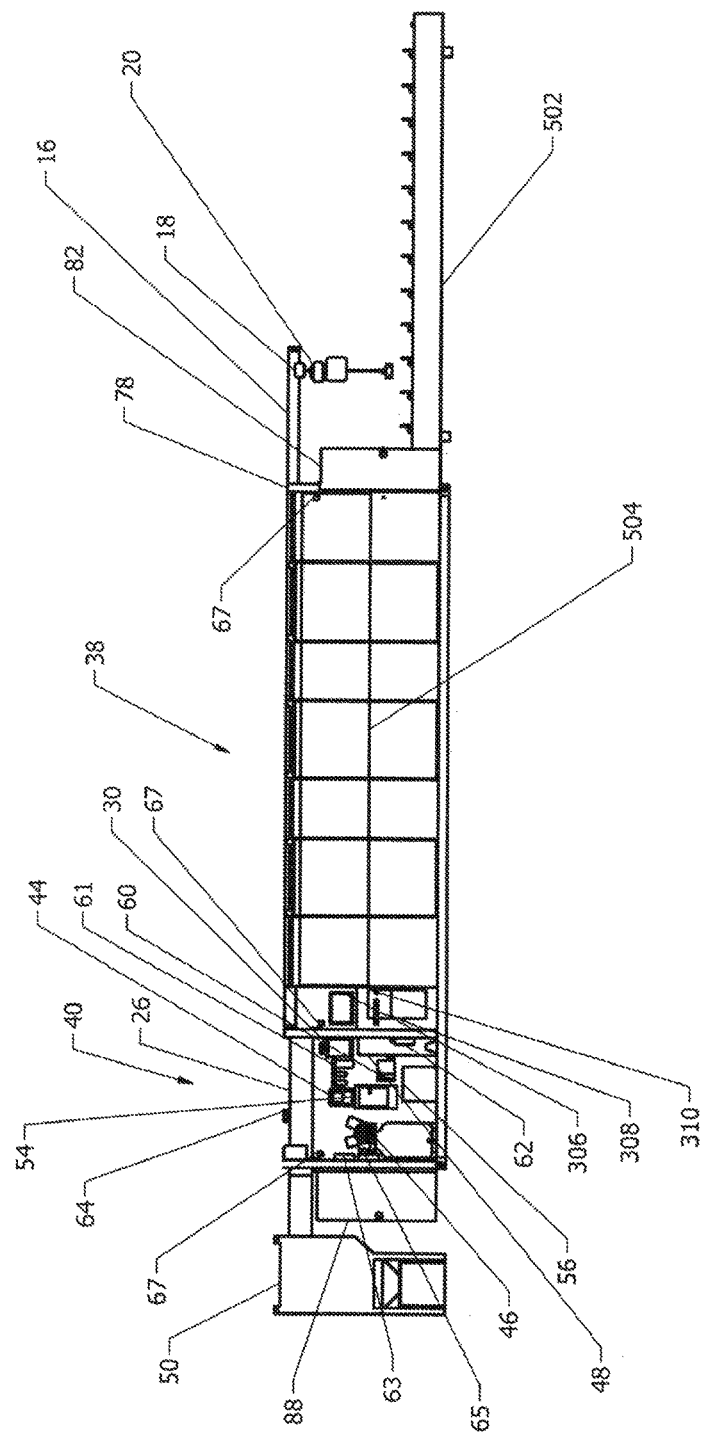
FIG. 3 is a rear view of the mobile CNC pipe cutting station of FIG. 1 with the rear exterior wall and roof not shown.

As plasma cutting is a dirty operation, a clean room effectively isolates major operating components from the dust and smoke produced in the pipe cutting room 38. As shown in FIG. 3, the dust and fumes are contained to the pipe cutting room 38 with an operable wall 504 and extracted through the dust extraction duct 26 to the dust and fume collector 50 located outside of the intermodal container 12. The clean room, generally referred to as 40 is separated from the pipe cutting room 38 by a fireproof wall 42 with a steel man interior door 41 (See FIG. 7). It contains an air dryer 44, an air compressor 46, a CNC electrical control box 48, an inlet power connection 52, an electrical panel 54, a transformer 56, plasma cutter power source 30, and a computer 60. The air dryer 44 can improve the quality of the cutting, if the ambient air is of high humidity. The air going to the plasma cutter torch 32 is compressed with the air compressor 46, dried with the air dryer 44, further cleaned and dried with an air filter, coalescer and desiccator system 61. These all function to improve cut quality. A heating and air conditioning unit 66 is also in the clean room 40.

As shown in FIG. 3, the clean room 40 also has a fire extinguisher 62, eyewash station 63, a smoke detector 64, a first aid kit 65, and an exit sign and light apparatus 67.

The pipe cutting room also has two fire extinguisher 62, two emergency exit sign and light apparatuses 67.

Returning to FIG. 1B, a first end 70 of the intermodal container 12 (and the pipe cutting room 38) has two large ISO intermodal portal doors 72, 74. Note that a single ISO door could alternatively be employed. A first end wall 78 with a first steel exterior man door 82 and a second opening 84 for pipe egress is directly inside the doors 72, 74. The exterior infeed conveyor 502 is located immediately adjacent to the opening 84 for delivering pipe through opening 84 to the infeed power roller conveyor 22 to deliver pipe to the CNC cutter. Returning to FIG. 2, a second steel exterior man door 88 provides entry through a second end wall 90 into the clean room 40 from the outside.

Figure 4:
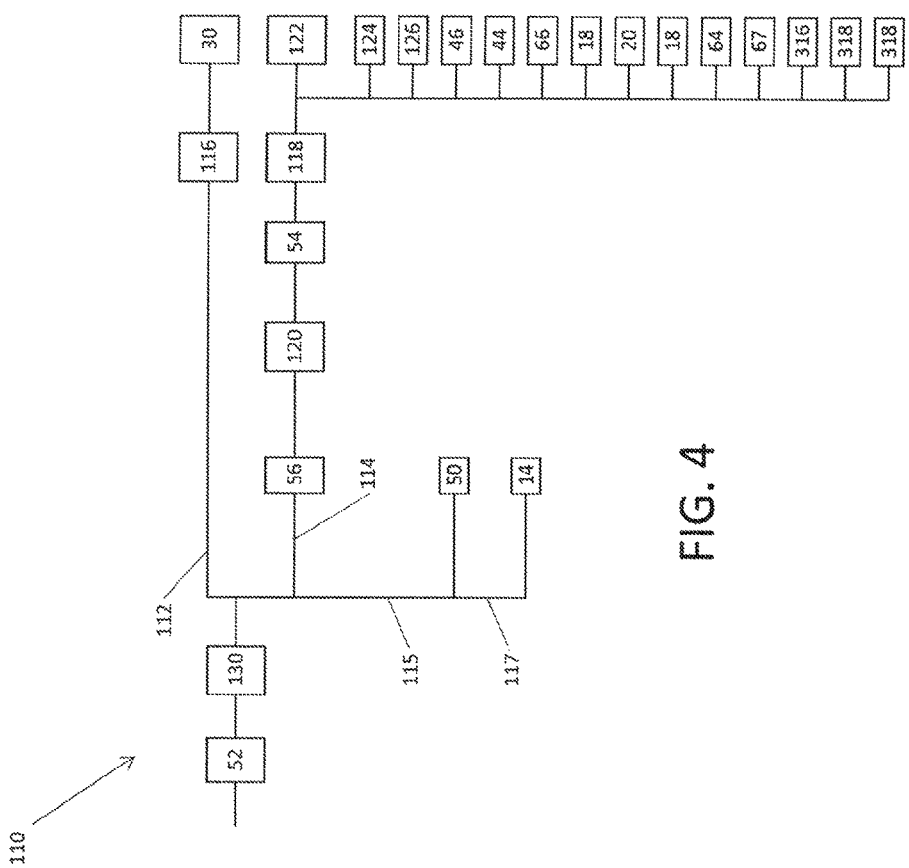
FIG. 4 is a schematic showing the electrical system of the mobile CNC pipe cutting station of FIG. 1.

As the station 10 is for transporting to a field site, all the components in the intermodal container 12 are bolted or otherwise affixed to the container 12. Once on site, the station 10 is powered by a generator or available site utility power grid by plugging the system into the inlet power connection 52 which powers a power system. The exterior infeed conveyor 502 and dust collector 50 are secured and stored inside the intermodal container 12 in the hallway 302 (see FIG. 7) during shipping and subsequently placed outside in position by use of caster wheels and a forklift. The monorail 16 is slid out of the intermodal container 12 in a cantilevered configuration for effective transport of pipes into and out of the intermodal container 12 (which will be discussed in FIG. 9 below). Referring to FIG. 4, a schematic of the power system, generally referred to as 110, shows that the inlet power connection 52 branches into 4 routes—route one 112, route two 114, route three 115 and route four 117. Route one 112 allows power to be drawn by the plasma cutter power source 30 through an emergency stop and lockout switch assembly 116. Route two 114 allows power to be drawn by many components (which will be discussed below) through an emergency stop and lockout switch assembly 118, the electrical panel 54, a power conditioner 120, and the transformer 56. Route three 115 allows power to be drawn by the dust and fume collector 50. Route four 117 allows power to be drawn by the CNC machine 14. The components drawing power through route 114 include exterior flood lights 122, interior lighting 124, 120V receptacle outlets for miscellaneous general use 126, air compressor 46, air dryer 44, heating, ventilating and air conditioning unit 66, powered trolley 18, powered hoist 20, smoke detectors 64, exit sign and light apparatus 67. The power system 110 powers the required components to make the station operable and is compliant with all applicable electrical codes including grounding and work leads. The power system includes a main kill switch 130 for emergency shut off and lock-out capabilities for maintenance and repair.

Figure 5:
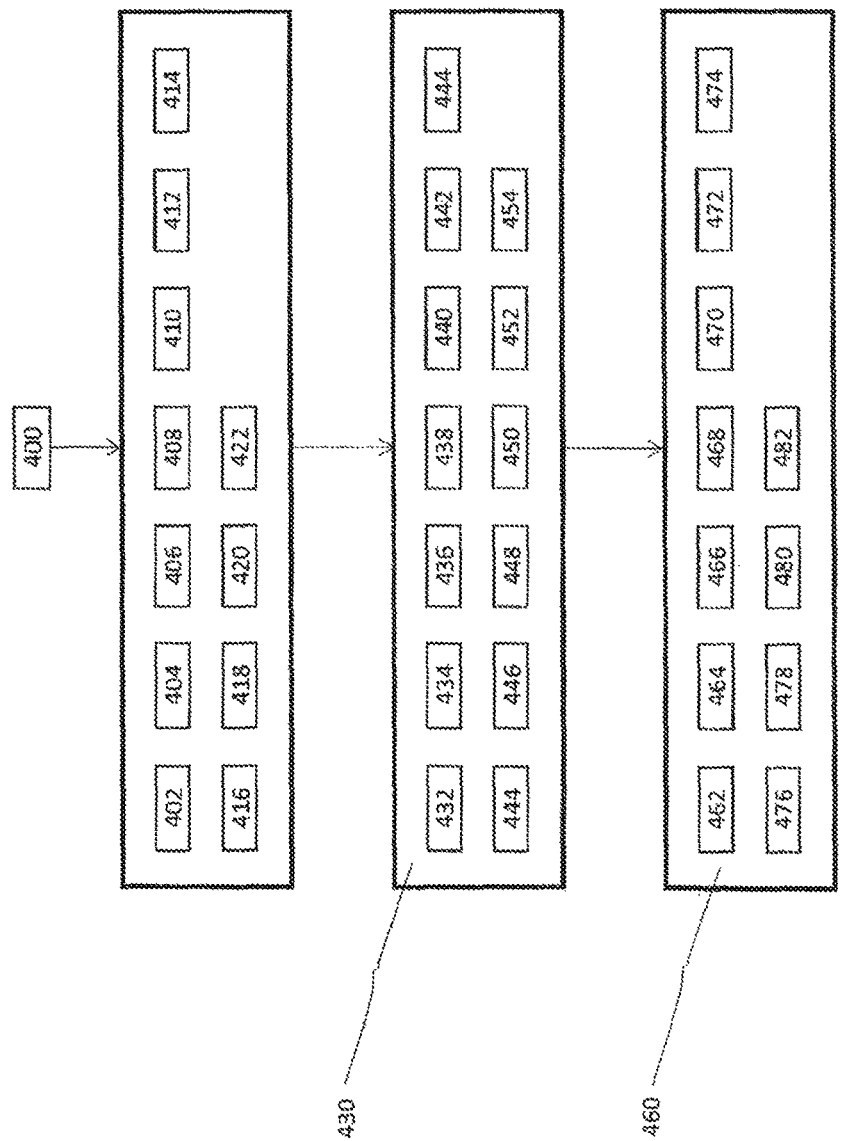
FIG. 5 is a non-exhaustive block diagram showing the processor controlled data management system.

As shown in FIG. 5, a client 400 provides some or all of the following information to the mobile CNC pipe cutting station 10: Specifications to be met 402, schedules to be met 404, manpower schedule 406, isometric drawings 408, 3 dimensional models 410, pipe line lists 412, pipe inventory data 414, pipe cut lists 416, site conditions and layout 418, available resources 420 and on the fly pipe information 422. This information is fed into the data management system 430. The data management system includes a memory configured to instruct a processor to: import isometric drawings from other CAD programmes 432, import three dimensional models from other Cad programmes 434, import pipe line lists 436, import pipe inventory data 438, import pipe cut lists 440, automatically nest parts 442, automatically and accurately estimate cut time and pipe quantities 444, schedule pipes to be cut to match client's schedule and manpower 446, use interactive CAD/CAM interfacing 448, design parts 450, instruct CNC machine to cut parts 452 and create an efficient manufacturing plan to match site layout and conditions 455. The memory then instructs the processor to communicate 460 the following to the client 400: An efficient manufacturing plan to fit site layout and conditions 462, pipe information such as heat number, etc. 464, tracking for each pipe and part cut 466, tracking of pipe inventory and data 468, management of uncut pipe and cut pipe inventory 470, a warehouse logistic plan 472, tracking of pipe usage 474, replicate specific parts and/or entire jobs 476, schedule feedback 478 and cost feedback 480. Cut pipe is also provided 482 to the client.

Figure 6:
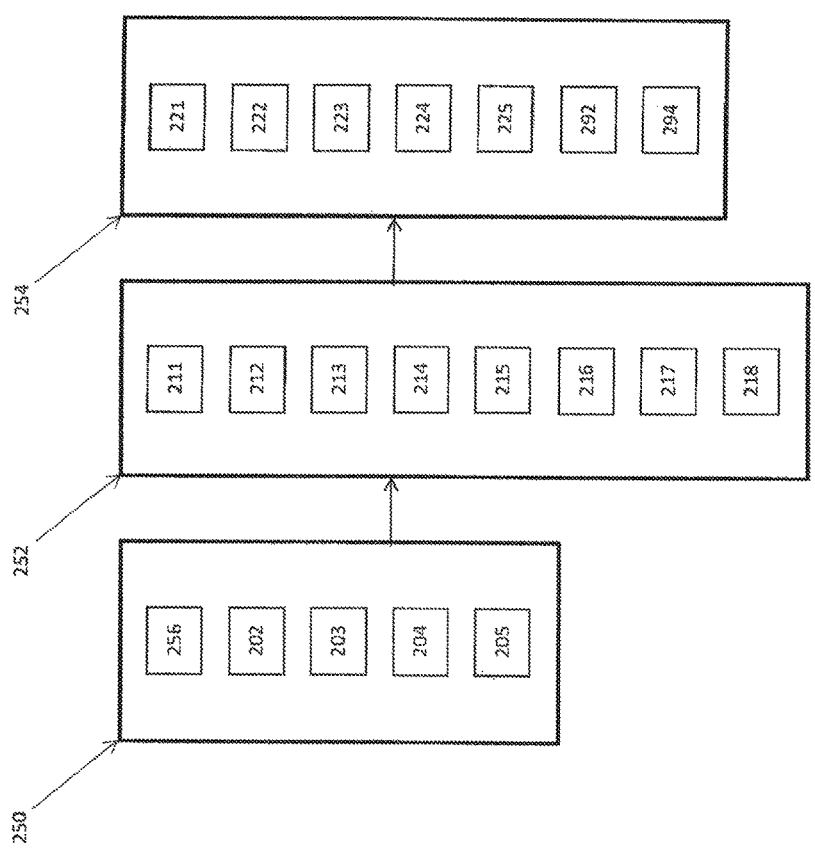
FIG. 6 is a non-exhaustive block diagram showing the data management system tasks.

As shown in FIG. 6, data variables can be input variables 250, process variables 252 and output variables 254. Variables that can be input are data from computer aided drafting programs 256, 3D modelling programs 258, spreadsheet and databasing programs 260, pipe information such as heat number, diameter, schedule, material 262, and on-the-fly operator input 264. The process variables 252 take the input variables 250 and manipulates the data as necessary to view 3 dimensional graphical representations of the pipe to be cut or multiple cuts 266, nesting 268, design parts 270, computer aided machining interfacing 272, auto track each pipe and part cut 274, track real time cut status from machine feedback 276, and scheduling 278, warehouse logistics and planning 280. The output variables 254 are part cut history 282, pipe usage history 284, estimate cut time 286, estimate cut times for entire jobs 288, find and replicate specific parts and entire jobs 290, track pipe inventory and data 292 and run and drive 294 the CNC machine components. This results in an efficient manufacturing plan that matches the site layout and conditions. As would be known to one skilled in the art, the data management system is an important component to excellent productivity, efficiency and accuracy and is not currently employed on the field.

The components are bolted or otherwise affixed to the container 12. Placement of many of the components is important for proper work flow, user comfort and user safety. This is especially with regard to the pipe cutting room and its components, and the monorail.

Figure 7:
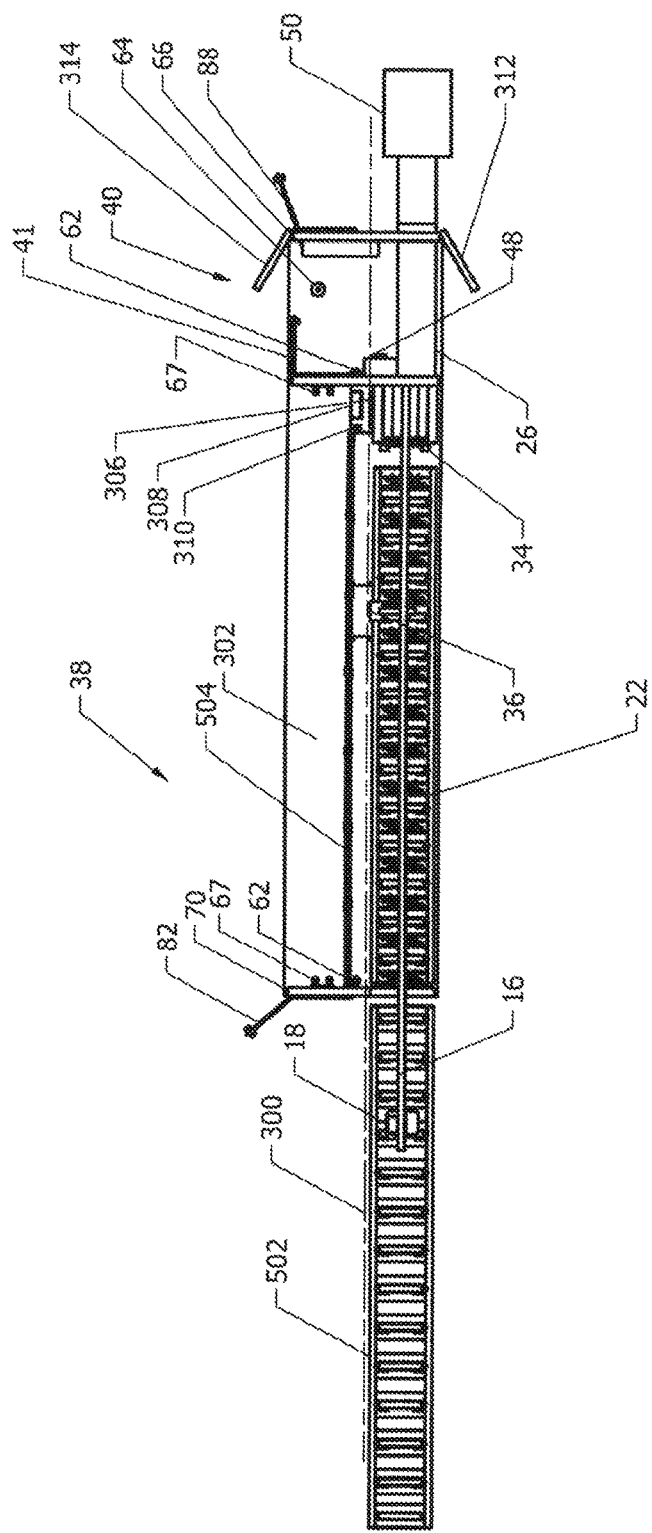
FIG. 7 is a top view of the mobile CNC pipe cutting station of FIG. 1 with the exterior walls and roof not shown.

FIG. 7 is a sectional top view showing the steel interior man door 41. It is for entry into the clean room 40 from the cutting room 38. The monorail 16, the CNC cutting machine 14, infeed power roller pipe conveyor 22, are offset from a centre line 300 of the pipe cutting room 38 to provide a hallway 302 between the first exterior man door 82 to the sliding interior man door 41. The operable wall 504 separates the hallway 302 from the monorail 16, the CNC cutting machine 14, infeed power roller pipe conveyor 22. The hallway 302 continues between the interior man door 41 and the second exterior man door 88. This hallway 302 provides a walking space substantially along the length of the pipe cutting room 38 and the clean room 40, from the first end 70 to the second end 304 for access and egress. A computer monitor 306, keyboard 308 and mouse 310, are located proximate the clean room 40 in the cutting room 38. Two exterior intermodal container (ISO) portal doors 312, 314 are located outside the second exterior man door 88. The portal doors 72, 74, 312, 314 add strength and integrity to the container 12, permitting it to be certified as an ISO container.

The use of an operable wall 504 allows for relatively simply and highly effective dust removal. In an earlier design, a dust duct and extraction arms were needed. With the dust and fume collector 50 located outside the container in use, and the operable wall 504, fumes and dust are both contained and removed.

Figure 8:
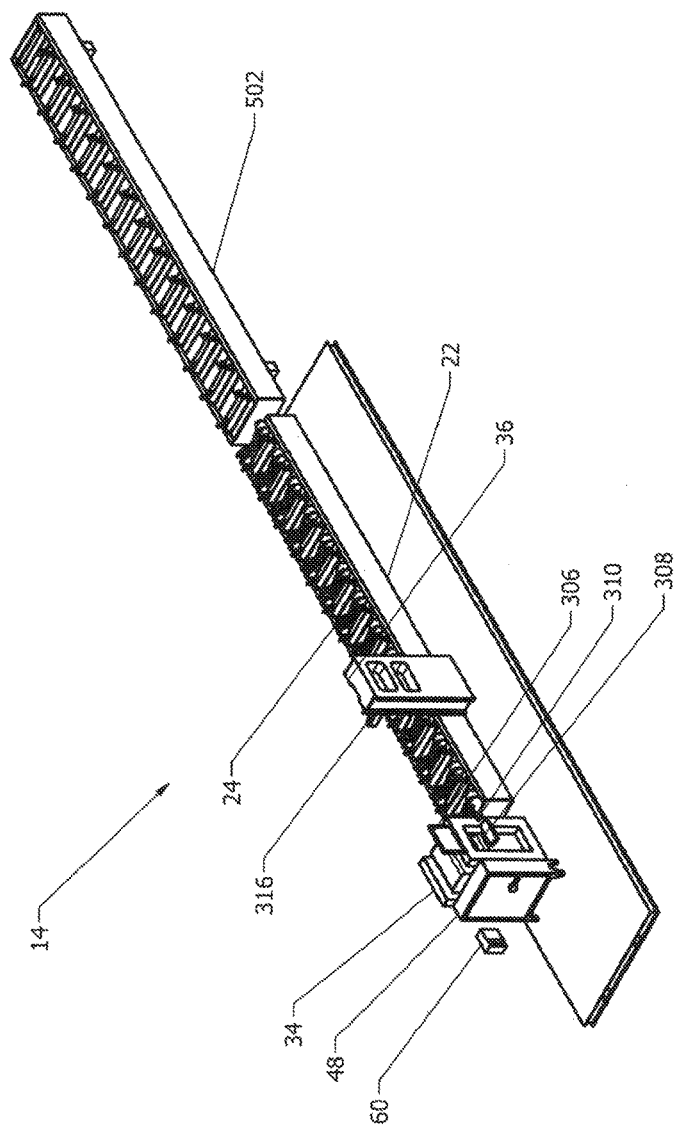
FIG. 8 is a perspective drawing of the CNC machine and its components.

As shown in FIG. 8, the following components are part of the CNC machine: the infeed power roller pipe conveyor 22 with at least two rollers 24, the floating chuck 34, the CNC controlled moving cutting apparatus 36, the electrical control box 48, the computer 60, the computer monitor 306, the keyboard 308, and the mouse 310, the automatic pipe marker system 316 and the exterior infeed conveyor 502. The CNC machine is configured to provide 4 axis torch movement giving ability to cut pipe saddles, laterals, copes, miters, T's, Y's, crosses, offsets, K's, complex intersections of 5 pipes, bevel angles, matching diameters, mismatching diameters, reinforcements, hole-on cuts, hole-in cuts, weld joint prep, and beveled holes for piping and structural applications. The computer 60 comes with software to form the processing component of the data management system.

Figure 9A:
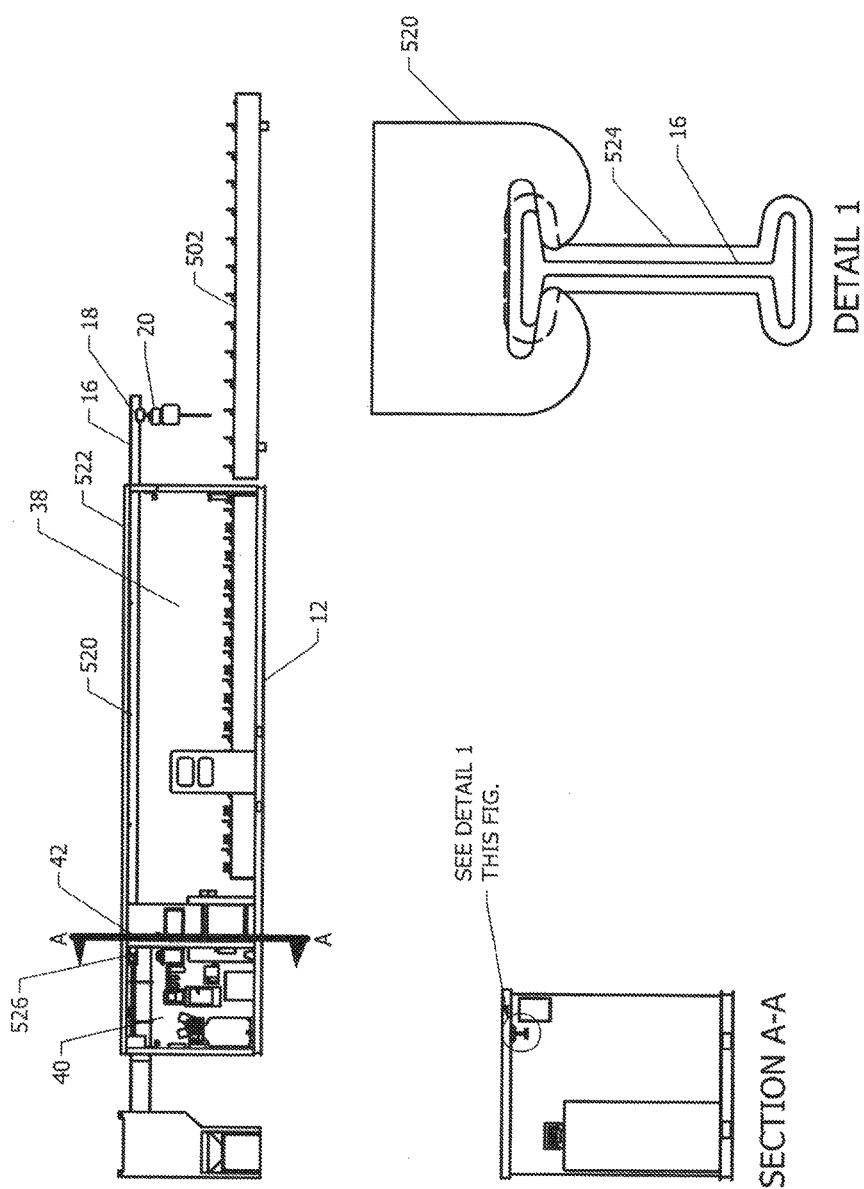
FIG. 9A is a perspective drawing showing the rail sliding system, rail, powered trolley and powered hoist.
Figure 9B:
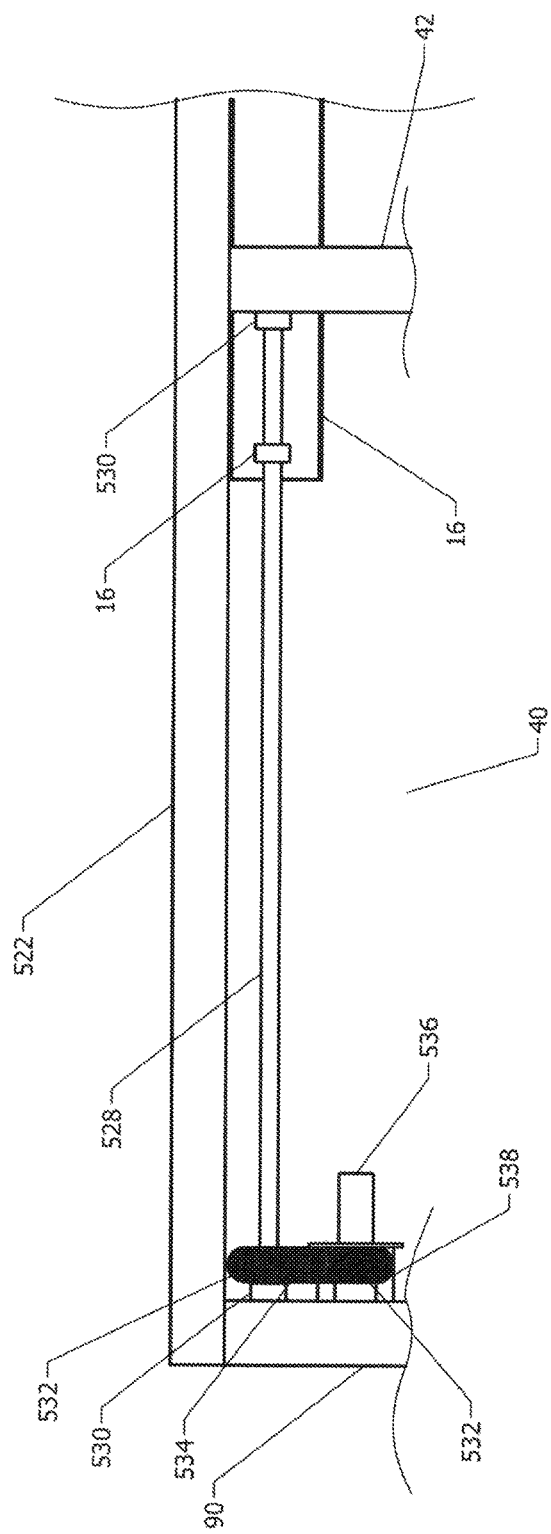
FIG. 9B is a perspective drawing of an alternative embodiment of FIG. 9A.

As shown in FIG. 9A the monorail 16 is allowed to slide in and out of the intermodal container 12 in a cantilevered configuration by use of the monorail sliders 520 which allows the powered trolley 18 and powered hoist 20 to place cut pipes on the exterior infeed conveyor 502 for removal. The monorail sliders are affixed to the structurally reinforced ceiling 522 of the pipe cutting room 38. An opening 524 corresponding to the profile of the monorail 16 is in the wall 42 between the pipe cutting room 38 and the clean room 40 to allow the monorail 16 to extend into the clean room 40 during storage and transport. The monorail 16 is then urged out of the intermodal container along the sliders 520 a distance to allow the powered trolley 18 and powered hoist 20 to move over at least a portion of the exterior infeed conveyor 502. In one embodiment, a double drum winch system 526 is used to move the monorail 16. In another embodiment, shown in FIG. 9B, a leadscrew 528 in the clean room 40 is aligned with the monorail 16 and is retained by two bearings 530 one on end wall 90 and another on clean room wall 42. The leadscrew is able to turn by two chain sprockets 532, a drive chain 534, and an electric motor 536. Electric motor 536 is mounted on to wall 90 by bracket 538 to retain it in place. When the leadscrew turns, the leadscrew nut 540, which is affixed to the monorail 16, will urge the monorail 16 in and out depending on the direction the motor 536 turns.

The intermodal container 12 is constructed to allow it to be stacked, lifted, placed on uneven terrain and transported by ship, train, truck and the like. For this reason, and to ensure fireproofing, it is steel construction. The container 12 meets the International Organization for Standardization (ISO) standards for freight containers. The design of the CNC machine is such that the container can be placed on uneven terrain such that it is out of level and/or not plumb and the CNC machine will function effectively and cut pipes to specification. This is because of the floating chuck 34 and CNC controlled moving torch apparatus 36 are able to automatically adjust to accommodate inconsistencies.

It is expected that after the pipe is loaded into the machine, that multiples of extremely complex cuts on large diameter and heavy pipes can be performed in 10 minutes or less and meet quality standards without compromising the safety of multiple tradesmen, a substantial improvement over conventional methods, producing significant cost and time savings. The station is capable of handling pipes of about 1.9 inches to about 36 inches in diameter, about 0.0625 inches thick to about 4 inches thick and weighing up to about 20,000 lbs. It is configured for cutting metal pipe. This pipe is usually random twenties and random forties metal pipe, meaning that it is about 20 feet to about 21 feet long, or about 40 to about 42 feet long. As would be known to one skilled in the art, shorter lengths may be loaded onto the conveyor and cut. Once cut, the pieces can be removed by hand, removed using the power trolley and hoist or by offloading using the conveyor.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A self-contained mobile pipe-cutting station, the station comprising an International Organization for Standardization (ISO) container including: a pipe cutting room comprising a first exterior door for egress to an ambient environment at a first end and an interior door at a second end, respectively, of the pipe cutting room and an at least one ISO portal door for egress to the ambient environment on the first end; a temperature controlled clean room separated from the pipe cutting room with a steel wall with the interior door therethrough, the pipe cutting room housing a plurality of components therein including: a rail system extending substantially a length of the pipe cutting room, and slidably mounted on a ceiling of the pipe cutting room, a powered hoist and a powered trolley moveably mounted on the rail system, a pipe conveyor mounted on a floor and aligned with the rail system to provide a hallway between the first exterior door and the interior door, a Computer Numerical Control (CNC) pipe cutter and a powered exterior conveyor, the powered exterior conveyor removably housed in the hallway and for locating outside the ISO container, the clean room housing a plurality of components therein including: a CNC pipe cutter electrical control box which is in electrical communication with the CNC pipe cutter, a computer which is in electronic communication with the CNC pipe cutter and includes a data management system, a heating and air conditioning unit, a dust extraction duct in fluid communication with the pipe cutting room, and a dust and fume collector removably housed in the clean room for locating outside the ISO container and in fluid communication with the dust extraction duct.

2. The station of claim 1, wherein the pipe cutting room further comprises an operable wall extending between the first exterior door and the interior door and located between the hallway and the CNC pipe cutter.

3. The station of claim 2, wherein the rail system is a monorail, the monorail slidably retained by an at least one monorail slider mounted on the ceiling of the pipe cutting room.

4. The station of claim 3, further comprising an opening between the pipe cutting room and the clean room for the monorail to extend into the clean room during storage and transport.

5. The station of claim 4, further comprising a mechanical device mounted in the clean room, in mechanical communication with the monorail and in electrical communication with a motor for urging the monorail into and out of the clean room.

6. The station of claim 5, wherein the mechanical device is a leadscrew.

7. The station of claim 5, wherein the mechanical device is a double drum winch.

8. The station of claim 5, further comprising a power system for electrical communication with any one of a battery, a power grid or a generator.

9. The station of claim 8, further comprising a second exterior door for egress to the ambient environment from the clean room and an at least one exterior ISO portal door at a second end of the container.

10. A method of cutting a pipe with a computer numerical control (CNC) pipe cutter, the method comprising: loading the pipe to be cut into the self-contained mobile pipe-cutting station of claim 3; positioning a floating chuck of the CNC pipe cutter on the pipe; and cutting the pipe under control of the CNC pipe cutter to provide an at least one pipe section.

11. The method of claim 10, further comprising removing the at least one pipe section from the pipe conveyor with the powered hoist loaded with the pipe section.

12. The method of claim 11, further comprising urging the monorail from the clean room, so as to extend a length of the monorail from the self-contained mobile pipe-cutting station into the ambient.

13. The method of claim 12, further comprising removing the pipe section from the self-contained mobile pipe-cutting station to the ambient with the powered trolley on the so extended monorail.

14. A processor driven method of producing pipe sections from a pipe inventory in an on-site, mobile, self contained pipe cutter station, the station comprising an ISO container, a CNC pipe cutter, a computer in electronic communication with the CNC pipe cutter, the computer including a data management system, the method comprising: designing an at least one pipe section to provide a pipe design; providing a cutting plan based on the pipe design; and the CNC pipe cutter cutting an at least one cut in at least one pipe according to the cutting plan wherein all steps are conducted within the on-site, mobile, self contained station.

15. The method of claim 14, further comprising managing the pipe inventory.

16. The method of claim 14, further comprising identifying the at least one pipe section.

17. The method of claim 16, further comprising displaying a three-dimensional graphical representation of the at least one cut in the at least one pipe.

18. The method of claim 14, wherein the cutting plan provides for multiple cuts in the at least one pipe.

19. The method of claim 14, wherein the cutting plan provides for nesting pipe sections in the at least one pipe.

* * * * *